United States Patent [19]

King et al.

[11] Patent Number: 4,707,374

[45] Date of Patent: Nov. 17, 1987

[54] THERMOSTABLE EDIBLE CREME

[75] Inventors: Gail G. King, Flanders, N.J.; Jiann-Yuh Chen, Irving; Barbara J. Keys, Arlington, both of Tex.

[73] Assignee: Frito-Lay, Inc., Dallas, Tex.

[21] Appl. No.: 929,423

[22] Filed: Nov. 12, 1986

[51] Int. Cl.$^4$ .................... A21D 13/08; A23L 1/04; A23G 3/00

[52] U.S. Cl. .................... 426/572; 426/659; 426/613; 426/321; 426/94

[58] Field of Search ............... 426/572, 659, 607, 613, 426/321, 94

[56] References Cited

U.S. PATENT DOCUMENTS

| | | | |
|---|---|---|---|
| 2,359,228 | 9/1944 | Lloyd et al. | 99/139 |
| 2,682,472 | 6/1954 | Wagner | 426/659 |
| 2,846,314 | 8/1958 | Aichele et al. | 426/572 |
| 3,198,637 | 8/1965 | Harris | 426/659 |
| 3,244,536 | 4/1966 | Kidger | 426/572 |
| 3,666,493 | 5/1972 | Bluemke | 99/139 |
| 3,669,688 | 6/1972 | Thompson | 99/139 |
| 3,687,690 | 8/1972 | Moore | 426/659 X |
| 4,444,799 | 4/1984 | Vanderveer et al. | 426/549 |
| 4,496,606 | 1/1985 | Michnowski | 426/658 |
| 4,518,622 | 5/1985 | Wilson et al. | 426/578 |

FOREIGN PATENT DOCUMENTS

WO86/01684  3/1986  PCT Int'l Appl. ............ 426/572

*Primary Examiner*—Jeanette Hunter
*Attorney, Agent, or Firm*—Bernard, Rothwell & Brown

[57] ABSTRACT

A thermostable edible creme having low water activity comprises a cooked dispersion of a modified starch and a hydrocolloid in a low-moisture solvent system which contains corn syrup.

23 Claims, No Drawings

THERMOSTABLE EDIBLE CREME

BACKGROUND OF THE INVENTION

1. Field of the Invention

This invention relates to the production of comestible products, particularly to the production of thermostable edible cremes. The invention also relates to the production of ready-to-eat cooked dough products, i.e., baked or fried dough products, in which a thermostable creme is combined with the dough prior to cooking.

2. Prior Art

Most creme-filled dough products, e.g., filled pastries, cookies and the like, are produced by first cooking a dough preform and then filling the cooked preform with the creme. The post-cook filling procedure is generally inconvenient and expensive, particularly in the commercial scale production of ready-to-eat creme-filled products. Pre-cook application of the creme to the dough product has not been widely employed because most of the edible cremes known in the prior art have exhibited poor thermal stability.

Edible cremes known in the prior art generally have high moisture levels and high water activities (typically, $A_w$ values of about 0.8 to 0.9). The water activity of a food is defined as the partial vapor pressure of water in the food divided by the saturation vapor pressure of pure water at the temperature of the food. It can be measured by placing a sample in a container, which is then sealed, and determining the relative humidity above the sample after equilibrium is reached. Water activity can be considered to be a measure of the tendency of a material to allow moisture to migrate out of the material to its surrounding environment.

The water activities of prior art cremes have been highly dependent on their water content. In order to achieve desirably creamy textures, it has been necessary to incorporate relatively large amounts of water into these creams, which has resulted in high water activities. The high water activities associated with these cremes are problematical, especially when the creme is used in a product in which it is in contact with a material of considerably lower water content, such as a baked pastry dough. Due to the disparity in moisture contents of the two materials and the relatively high water activity of the creme, moisture tends to migrate from the creme into the pastry, making the pastry soggy.

Cremes having high water activities also provide a medium which is conducive to microbial growth. Thus, ready-to-eat products containing cremes of the prior art tend to have limited shelf lives due to microbial growth.

It would be highly desirable to produce a thermostable edible creme having a low water activity, i.e., a water activity below about 0.7. Moreover, it would be desirable to produce such a creme in which the water activity is relatively independent of water content so that the texture can be controlled independently of water activity.

SUMMARY OF THE INVENTION

There is provided by the present invention a thermostable edible creme having a water activity of about 0.7 or less comprising a cooked dispersion of a modified starch and a hydrocolloid in a low-moisture solvent system which contains corn syrup, said solvent system comprising from 25 weight percent to 100 weight percent corn syrup and from 75 weight percent to 0 weight percent lactose hydrolysate. Preferably, the thermostable cream also contains a fat and an emulsifier to improve texture.

There are also provided comestible products comprising a cooked dough, e.g., baked or fried dough, filled with the thermostable edible creme of the invention. The comestible product can be in the form of a creme puff, layered pastry, fried pie cookie, extruded center-filled collet or other form. In preparing the comestible product, the uncooked dough is first filled with the creme and the dough and creme are then cooked together. Due to the thermostability of the creme, it is able to withstand the high temperatures of baking or frying without losing its texture. The comestible product thus produced has a relatively long shelf life, since the low water activity of the creme prevents moisture from migrating into the dough portion of the product and minimizes microbial activity. The cremes of the invention are also remarkably resistant to syneresis (also known as "weeping"), which commonly occurs with prior art cremes when they are subject to temperature changes.

DETAILED DESCRIPTION OF THE PREFERRED EMBODIMENTS

The thermostable edible creme of the invention is produced by cooking a dispersion of a modified starch and a hydrocolloid in a low-moisture solvent system, said solvent system comprising from 25 weight percent to 100 weight percent corn syrup and from 75 weight percent to 0 weight percent lactose hydrolysate.

The corn syrup and, if present, lactose hydrolysate provides a low moisture solvent for the other ingredients and acts as a humectant to reduce the water activity of the creme. Corn syrups can be described as concentrated water solutions of partially hydrolyzed corn starch. Corn syrups can be classified on the basis of D.E. values. The term D.E. is used herein to refer to the reducing sugars content of the dissolved solids in starch hydrolysates expressed as percent dextrose, as measured by the Luff-Schoorl method (NBS Circular C-40, page 195 as appearing in "Polarimetry Saccharimetry, and the Sugars" by Frederick J. Bates and Associates). Generally speaking, the corn syrup for use in the present invention has a D.E. value of from about 40 to about 65 Preferably, the D.E. value is from 40 to about 45. Since corn syrups contain dextrose, maltose, and higher oligosaccharides derived from starch by acid or enzymatic hydrolysis or by a combination of the two, another basis for characterization of the corn syrup is with respect to the content of individual saccharides For example, a particularly preferred corn syrup for use in the present invention is a high fructose corn syrup. The use of corn syrup—especially when the corn syrup is a mixture of syrups, one of which is high fructose corn syrup—allows the production of cremes having low levels of water activity. The amount of corn syrup needed to form the cremes is at least an amount sufficient to disperse the remaining ingredients therein. Preferably, the corn syrup is present in the creme in an amount from about 90% to about 95%, based on the total weight of the creme.

The low-moisture solvent system optionally contains up to about 75 weight percent lactose hydrolysate. Advantageously, the low-moisture solvent system contains from 25 weight percent to 100 weight percent corn syrup and from 0 weight percent to 75 weight percent lactose hydrolysate. By using lactose hydrolysate in place of a portion of the corn syrup, a creme is obtained which has a lower level of sweetness and is therefore adaptable to the incorporation of non-sweet flavors. As those skilled in the art are aware, lactose hydrolysate comprises glucose and galactose.

In preparing the creme, a modified starch is dispersed in the low-moisture solvent system. The modified starch provides body to the creme, gives short texture and imparts stability during processing and storage. A preferred modified starch is tapioca starch which has been modified by cross-linking and which has a viscosity from about 100 to 500 Brabender units at 95° C., preferably from about 150 to 400 Brabender units. Starches of this type include, for example, a modified tapioca starch which is commercially available under the tradename NATIONAL FRIGEX TM (National Starch Corp.). The modified starch is present in the creme in an amount sufficient to impart the desired texture and stability, which is generally from about 4% to about 6%, based on the total weight of the creme. The modified starch can be dispersed in the corn syrup by any conventional means which will result in a thorough dispersion, such as a high speed mixer.

At least one hydrocolloid is also dispersed in the low-moisture solvent system. Hydrocolloids serve to establish the structure of the creme due to their high water binding capacity and their gel-forming properties at high temperatures. The hydrocolloids which can be used to prepare the cremes of the present invention can be natural or synthetic gums and include such colloids as carrageenan, guar gum, alginate, xanthan gum and the like or methylcellulose, carboxymethylcellulose, ethylcellulose, hydroxypropylmethylcellulose, microcrystalline cellulose and the like. The hydrocolloid is present in an amount from about 0.5% to 2.0%, based on the total weight of the creme.

Preferably, two hydrocolloids are employed, one of which is a hydroxypropylmethylcellulose having a viscosity from about 10,000 cps to about 20,000 cps, and the other of which is a hydroxypropylmethylcellulose having a viscosity from about 2,000 cps to 8,000 cps (2% aqueous solution viscosity measured using an Ubbelhode tube), both having a thermal gelation temperature range from 70° C. to 90° C. in aqueous media. Hydroxypropylmethylcelluloses satisfying these criteria are commercially available, for example, as METHOCEL TM $K_{15}M$ (15,000 cps) and METHOCEL TM $K_4M$ (4,000 cps) (The Dow Chemical Co., Midland, Mich.). The higher viscosity hydroxypropylmethylcellulose, e.g., METHOCEL TM $K_{15}M$ provides body, creaminess and good emulsification stabilization. The lower viscosity hydroxypropylmethylcellulose inhibits boil-out during cooking. The higher viscosity hydroxypropylmethylcellulose is preferably present in an amount from about 0.5% to about 1% and the lower viscosity hydroxypropylmethylcellulose is preferably present in an amount from about 0.25% to about 0.8%, based on the total weight of the creme.

Advantageously, other solid ingredients which are capable of being dispersed in the low-moisture solvent system and which contribute to the development of body and texture may be dispersed in the low-moisture solvent system. These include, for example, proteins and gelling agents therefor. In one embodiment of the invention, egg albumin can be added, in the form of egg white solids, together with a source of $Ca^{++}$ ions. $Ca^{++}$ ions are known to interact with proteins such as albumin or caseinate to form stable gel structures which may enhance the texture of the thermostable creme.

Advantageously, $Ca^{++}$ ions can be provided in the form of modified whey solids. As those skilled in the art are aware, modified whey solids are produced from whey fluid by first ultrafiltering to separate out protein. The liquid fraction containing water, lactose, $Ca^{++}$ and other mineral components, is known as whey permeate. Whey permeate is dried to produce modified whey solids. Preferably, the protein, such as egg albumin, and gelling agent, such as modified whey solids when present, do not exceed about 0.5% by weight of the total weight of the thermostable creme.

If desired, proteins such as whey protein or egg protein can also be dispersed in the low-moisture solvent system to impart body to the creme. The proteins can be added in amounts up to about 0.5 weight percent, based on the weight of the creme.

A preferred method for preparing the thermostable, edible creme of the invention comprises preblending the modified starch, hydrocolloid and, if present, other solid ingredients including protein and $Ca^{++}$ source; dispersing the preblended dry ingredients in the low-moisture solvent system at room temperature; and cooking the dispersion. Mild agitation is employed to facilitate dispersion by preventing clumping of the hydrocolloids in the solvent system.

Alternatively, the modified starch can be dispersed in the low-moisture solvent system and the disperison heated to about 80° C. prior to addition of the hydrocolloid(s). Dispersion of the hydrocolloid(s) is facilitated by the elevated temperature. Other solid ingredients, if present, can either be preblended with the modified starch or added with the hydrocolloid.

The dispersion containing the modified starch and hydrocolloid(s) is cooked, preferably at a temperature from about 85° C. to 95° C. Cooking time can vary from about 45 minutes to 120 minutes.

After cooking, and preferably while the cooked dispersion is still at a temperature from about 60° C. to about 80° C., a fat and an emulsifier are added to modify the texture. The fat can be high in unsaturation or can be a saturated fat. Unsaturated fats give a softer texture to the creme. Unsaturated fats which can be employed include safflower oil, sunflower oil, cottonseed oil, soybean oil and corn oil. The saturated fats that can be used include the hydrogenated oil products of coconut, olive, corn, cottonseed, peanut, etc. While the melting points of the fats will generally vary according to the degree of saturation, fats having Wiley melting points of 80°–100° F. are preferred. A preferred fat is coconut fat, having a Wiley melting point of 92° F. The fat is generally added to the creme formulation in an amount from about 0% to 10% based on the total weight of the creme.

Suitable emulsifiers include hydroxylated lecithin and mono-, di- or polyglycerides of fatty acids, such as monostearin and monopalmitin.

Many blends of emulsifiers are commercially used and readily available. For example, it may be desirable to provide a controlled hydrophilic-lypophilic balance (HLB) as with a lypophilic emulsifier such as glyceryl monostearate or sorbitan monostearate with a hydrophilic material such as Polysorbate 60. When a blend of emulsifiers is used, the HLB value should be from about 8 to about 13 because this range is more hydrophilic and forms oil in water emulsions. HLB values from 1 to 8 should be avoided since this range is more lypophilic and may provide undesirable properties to the product. A particularly preferred emulsifier is available commercially as Panodan SDK. The emulsifier is present in an amount from about 0% to about 0.1%, based on the total weight of the creme.

While water is not required, aside from being inherently present in various ingredients, it may be desirable to add water as needed to increase the moisture level of the creme to about 5% to about 25%, based on the weight of the creme. Preferably, the moisture level is about 21%.

Various food grade acidulents may be added to the creme according to one's taste preferences. Examples of such acidulents include fumaric, phosphoric, tartaric, malic and citric acid. Preferably, citric acid is used.

Flavoring agents can be added to the cremes to impart various flavors to the creme. While the amount of such flavoring agents will vary, generally such agents are added in amounts of from about 0 to about 10 weight percent of the creme. Suitable flavoring agents can be employed to impart vanilla, creme, chocolate, cheese, butter, coffee, fruit, mint, vegetable or other flavors.

Aside from the above ingredients, other additives may be dispersed in the corn syrup. Such additives are generally present in conventional amounts to impart their characteristic effects to the creme. Typically an opacifying agent or coloring agent, such as titanium dioxide, is added because the basic ingredients will otherwise produce an essentially colorless, clear creme. Titanium dioxide, a whitening agent which is heat stable, can be dry blended with the modified starch prior to dispersing it in the corn syrup. Titanium dioxide is generally present in an amount from 0.5% to 0.7%, based on the total weight of the creme. Other additives that are heat stable, such as salt, may also be added to the creme formulation prior to the cooking cycle.

The creme of the present invention can be used to produce a variety of ready-to-eat comestible products Particularly preferred comestibles are those in which the creme is used to fill an uncooked dough preform or the creme is layered with a puff pastry dough and the combined dough and filling are then baked or fried. Exemplary of such products are puff pastries, fried pie cookies, creme puffs and center-filled collets.

Using the method of the invention, we have produced cremes having water activities from 0.6 to 0.7. The viscosities of the cremes are generally in the range of 600,000 cps to 1,200,000 cps. Due to the low water activities of the cremes, the filled dough products have shelf lives of up to about 120 days.

The following examples further illustrate the present invention and are not intended to limit its scope in any way.

In the following examples, all parts and percents are by weight and all temperatures are in degrees centigrade unless otherwise indicated. In the examples, "HFCS" indicates high fructose corn syrup.

EXAMPLE I

A thermostable, edible creme was prepared from the following ingredients:

| Ingredients | Parts by Weight |
| --- | --- |
| HFCS | 94.00 |
| Modified Starch (National FRIGEX TM) | 5.15 |
| Hydroxypropylmethylcellulose (METHOCEL TM K$_{15}$M) | 0.50 |
| Hydroxypropylmethylcellulose (METHOCEL TM K$_4$M) | 0.25 |
| Egg White Solids | 0.05 |
| Modified Whey Solids | 0.05 |

The modified starch, hydroxypropylmethylcellulose gums, egg white solids and modified whey solids were blended together and the mixture was dispersed by mild agitation in the corn syrup at room temperature. The mixture was heated in a double boiler to 90° C. The temperature was maintained at 90° C. to 95° C., with occasional stirring for one hour.

The creme thus produced had a water activity of 0.691, 23.10% moisture and a viscosity of 714,000 cps. This creme can be rewarmed to 30° C. and flavored as described below. Pastry dough can be pre-filled with the base or flavored creme and baked at 500° F. for 8 minutes.

| FLAVOR SYSTEMS FOR THERMOSTABLE CREME OF EXAMPLE I | |
| --- | --- |
| I. Vanilla Creme | |
| Base Creme | 99.32% |
| Salt | 0.50% |
| Cornish Creme | 0.15% |
| Sweetness Modifier | 0.02% |
| FD&C Yellow #5 | 0.01% |
| Water Activity | 0.679 |
| Percent Moisture | 19.70 |
| Viscosity | 980,000 cps |
| II. Chocolate Creme | |
| Base Creme | 95.74% |
| Light Dutch Cocoa | 2.56% |
| Natural Chocolate Flavor | 1.28% |
| Titanium Dioxide | 0.38% |
| Vanilla | 0.04% |
| Water Activity | 0.691 |
| Percent Moisture | 22.18 |
| Viscosity | 1,220,000 cps |
| III. Lemon Creme | |
| Base Creme | 99.23% |
| Citric Acid/Malic Acid | 0.40% |
| Natural Lemon Flavor | 0.25% |
| Natural Color | 0.12% |
| Water Activity | 0.681 |
| Percent Moisture | 22.81 |
| Viscosity | 960,000 cps |
| IV. Pecan Creme | |
| Base Creme | 79.07% |
| Pecans | 19.77% |
| Natural Egg Flavor | 0.80% |
| Salt | 0.20% |
| Vanilla | 0.08% |
| Caramel | 0.08% |
| Water Activity | 0.689 |
| Percent Moisture | 19.61 |
| Viscosity | Not Applicable |
| V. Cheese Cake Creme | |
| Base Creme | 79.60% |
| Cream Cheese Flavor | 20.00% |
| Powdered Citric Acid | 0.30% |
| Natural Butter Flavor | 0.10% |
| Water Activity | 0.678 |
| Percent Moisture | 21.30 |
| Viscosity | 1,528,000 cps |

EXAMPLE II

A thermostable edible creme was prepared from the following ingredients:

| Ingredient | Parts by Weight |
| --- | --- |
| HFCS | 100.00 |
| Modified starch (National FRIGEX TM) | 5.50 |
| Titanium dioxide | 0.60 |
| Hydroxypropylmethylcellulose (METHOCEL TM $K_{15}M$) | 0.75 |
| Hydroxypropylmethylcellulose (METHOCEL TM $K_4M$) | 0.25 |
| Cornish creme (vanilla creme) | 0.15 |
| Salt | 0.50 |

The modified starch and titanium dioxide were dry blended and mixed with the HFCS at room temperature. The container was then placed in a boiling water bath and the starch/corn syrup dispersion was heated to 80° C. The METHOCEL TM $K_{15}M$ was then added with stirring and the dispersion was cooked at 90° C. until it thickened. The dispersion was then removed from the heating bath and the METHOCEL TM $K_4M$ was added with mixing. When the temperature of the dispersion had dropped to 65° C., the cornish creme and salt were added with mixing. The resultant creme had a water content of 21% and a water activity of 0.68.

A pie dough was prepared from enriched wheat flour, vegetable shortening, water, dextrose and salt. The dough was rolled out and cut into circles and 11 grams of the creme were placed in each circle. The dough was folded over and the edges sealed with water. The surface was docked and the dough/creme composites were baked by passage through a preheated 5-zone oven, 6 ft. in length, at a rate of 8"/min. The zone temperatures of the oven were as follows (T=top, B=bottom):

| Zone 1 | T - No heat |
| --- | --- |
|        | B - 425° C. |
| Zone 2 | T - 177° C. |
|        | B - 177° C. |
| Zone 3 | T - 177° C. |
|        | B - 177° C. |
| Zone 4 | T - 160° C. |
|        | B - 160° C. |
| Zone 5 | T - 425° C. |
|        | B - No heat |

The baked composites were allowed to cool to room temperature. The creme did not exhibit any visible syneresis effects. The resultant "pie cookies" were stored for a period of 60 days under ambient conditions, after which time the baked dough portion did not exhibit any sogginess.

EXAMPLE III

Thermostable cremes incorporating lactose hydrolysate were prepared from the following ingredients:

| Ingredients | Percent by Weight |
| --- | --- |
| Formula A | |
| HFCS | 69.85 |
| Lactose Hydrolysate (80% Soluble) | 23.28 |
| National Frigex Starch | 5.00 |
| Titanium Dioxide | 0.55 |
| Hydroxypropylmethylcellulose (METHOCEL TM $K_{15}M$) | 0.69 |
| Hydroxypropylmethylcellulose (METHOCEL TM $K_4M$) | 0.46 |
| Sweetness Modifier | 0.02 |
| Cornish Creme | 0.15 |
| TOTAL | 100.00 |
| Formula B | |
| HFCS | 83.81 |
| Lactose Hydrolysate (80% Soluble) | 9.32 |
| National Frigex Starch | 5.00 |
| Titanium Dioxide | 0.55 |
| Hydroxypropylmethylcellulose (METHOCEL TM $K_{15}M$) | 0.69 |
| Hydroxypropylmethylcellulose (METHOCEL TM $K_4M$) | 0.46 |
| Sweetness Modifier | 0.02 |
| Cornish Creme | 0.15 |
| TOTAL | 100.00 |

In each instance, the modified starch and titanium dioxide were dry blended and mixed with the HFCS and lactose hydrolysate at room temperature. The container was then placed in a boiling water bath and the dispersion was heated to 80° C. The METHOCEL TM $K_{15}M$ was then added with stirring and dispersion was cooked at 90° C. until it thickened. The dispersion was then removed from the heating bath and the METHOCEL TM $K_4M$ was added with mixing. When the temperature of the dispersion had dropped to 30° C., the cornish creme and sweetness modifier were added with mixing.

The creme produced from Formula A had an $A_w$ at 0.698, moisture content of 21.8% and viscosity of 542,000 cps. The creme produced from Formula B had an $A_w$ of 0.65, moisture content of 17.1% and viscosity of 964,000 cps.

What is claimed is:

1. A thermostable edible creme having a water activity of about 0.7 or less comprising a cooked dispersion of a modified starch in an amount sufficient to provide body, short texture and stability and a hydrocolloid in an amount sufficient to provide binding and gelling properties at high temperatures. In a low-moisture solvent system which contains corn syrup, said solvent system comprising from 25 weight percent to 100 weight percent corn syrup and from 75 weight percent to 0 weight percent lactose hydrolysate.

2. A thermostable edible creme as claimed in claim 1, wherein the modified starch is a cross-linked tapioca starch having a viscosity of from about 100 to about 500 Brabender units at 95° C.

3. A thermostable edible creme as claimed in claim 1, wherein the modified starch is a cross-linked tapioca starch having a viscosity of from about 150 to 400 Brabender units at 95° C.

4. A thermostable edible creme as claimed in claim 1, containing two hydrocolloids, one of which is a hydroxypropylmethylcellulose having a viscosity of from about 10,000 cps to 20,000 cps and the other of which is a hydroxypropylmethylcellulose having a viscosity of from about 2,000 cps to 8,000 cps (2% aqueous solution viscosity measured using an Ubbelhode tube), both of said hydrocolloids having a thermal gelation temperature range from 70° C. to 90° C. in aqueous media.

5. A thermostable edible creme as claimed in claim 1, wherein the corn syrup is high fructose corn syrup.

6. A thermostable edible creme as claimed in claim 5, which contains from about 90% to 95% high fructose corn syrup, from about 4% to 6% cross-linked tapioca starch having a viscosity of from about 100 to 500 Brabender units at 95° C., from about 0.5% to 1% hydroxypropylmethylcellulose having a viscosity from about 10,000 cps to 20,000 cps and from about 0.25% to 0.8% hydroxypropylmethylcellulose having a viscosity from about 2,000 cps to about 8,000 cps (2% aqueous solution viscosity measured using an Ubbelhode tube), based on the total weight of the creme.

7. A thermostable edible creme as claimed in claim 6, which has an $A_w$ from about 0.5 to 0.7.

8. A thermostable edible creme as claimed in claim 6, which has a moisture content from about 12% to 25%.

9. A thermostable edible creme as claimed in claim 6, which has a viscosity from about 600,000 cps to 1,200,000 cps.

10. A method of producing a thermostable edible creme which comprises dispersing a modified starch and a hydrocolloid in a low-moisture solvent system comprising from 25 weight percent to 100 weight percent corn syrup and from 0 weight percent to 75 weight percent lactose hydrolysate; and cooking the dispersion.

11. A method as claimed in claim 10, wherein the modified starch is a cross-linked tapioca starch having a viscosity from about 100 to about 500 Brabender units at 95° C.

12. A method as claimed in claim 10, wherein the modified starch is a cross-linked tapioca starch having a viscosity from about 150 to 400 Brabender units at 95° C.

13. A method as claimed in claim 10, wherein two hydrocolloids are dispersed in the low-moisture solvent system, one of which is a hydroxypropylmethylcellulose having a viscosity of from about 10,000 cps to 20,000 cps and the other of which is a hydroxypropylmethylcellulose having a viscosity of from 2,000 cps to 8,000 cps (2% aqueous solution viscosity measured using an Ubbelhode tube), both of said hydrocolloids having a thermal gelation temperature range from 70° C. to 90° C. in aqueous media.

14. A method as claimed in claim 10, wherein the corn syrup is a high fructose corn syrup.

15. A method as claimed in claim 10, wherein high fructose corn syrup is present in an amount from 90% to 95%, cross-linked tapioca dextrin having a viscosity from about 100 to 500 Brabender units at 95° C. is dispersed therein in an amount from 4% to 6%, a first hydroxypropylmethylcellulose having a viscosity from about 10,000 cps to 20,000 cps (2% aqueous solution viscosity measured using an Ubbelhode tube) is dispersed therein in an amount from 0.5% to 1% and a second hydroxypropylmethylcellulose having a viscosity from about 2,000 cps to 8,000 cps (2% aqueous solution viscosity measured using an Ubbelhode tube) is dispersed therein in an amount from about 0.25% to 0.8%, all of said percentages being based on the final weight of the edible creme.

16. A method as claimed in claim 10, wherein the dispersion is cooked at a temperature from about 85° C. to 95° C.

17. A method as claimed in claim 10, wherein the dispersion is cooked to a final moisture content of from about 15% to 25%.

18. A method as claimed in claim 10, wherein a fat and an emulsifier are added to the creme.

19. A thermostable edible creme as claimed in claim 1, wherein there is additionally dispersed in the low-moisture solvent system a protein and a gelling agent therefor.

20. A thermostable edible creme as claimed in claim 19, wherein the protein is in the form of egg white solids and the gelling agent is in the form of modified whey solids.

21. A thermostable edible creme as claimed in claim 19, wherein the protein and gelling agent therefor comprise up to about 0.5% by weight of the creme.

22. A shelf-stable comestible product comprising a cooked dough product which is filled with the thermostable edible creme of claim 1.

23. A method of producing a shelf-stable comestible product which comprises filling an uncooked dough product with the thermostable edible creme of claim 1 and cooking the filled dough.

* * * * *